United States Patent
Minamisawa

(10) Patent No.: US 11,372,259 B2
(45) Date of Patent: Jun. 28, 2022

(54) OPTICAL UNIT HAVING SHAKE CORRECTION FUNCTION

(71) Applicant: NIDEC SANKYO CORPORATION, Nagano (JP)

(72) Inventor: Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 391 days.

(21) Appl. No.: 16/700,225

(22) Filed: Dec. 2, 2019

(65) Prior Publication Data

US 2020/0174275 A1  Jun. 4, 2020

(30) Foreign Application Priority Data

Nov. 30, 2018 (JP) .............................. JP2018-224949
Mar. 28, 2019 (JP) .............................. JP2019-063495

(51) Int. Cl.
*G02B 27/64* (2006.01)
*G03B 5/06* (2021.01)

(52) U.S. Cl.
CPC ............. *G02B 27/646* (2013.01); *G03B 5/06* (2013.01); *G03B 2205/0023* (2013.01); *G03B 2205/0069* (2013.01)

(58) Field of Classification Search
CPC .................... G02B 27/646; G03B 5/06; G03B 2205/0023; G03B 2205/0069
See application file for complete search history.

(56) References Cited

U.S. PATENT DOCUMENTS

| | | | |
|---|---|---|---|
| 2018/0224665 A1* | 8/2018 | Im | G02B 7/021 |
| 2019/0129197 A1* | 5/2019 | Kim | G03B 17/17 |
| 2020/0301160 A1* | 9/2020 | Fujisaki | G02B 26/0816 |
| 2020/0310150 A1* | 10/2020 | Minamisawa | H02K 7/14 |
| 2020/0333622 A1* | 10/2020 | Fujisaki | G03B 17/17 |
| 2021/0286193 A1* | 9/2021 | Kwon | G06F 1/1686 |

FOREIGN PATENT DOCUMENTS

| | | |
|---|---|---|
| JP | 2011069915 A | 4/2011 |
| JP | 2018189816 A | 11/2018 |

* cited by examiner

*Primary Examiner* — Cara E Rakowski
(74) *Attorney, Agent, or Firm* — Cantor Colburn LLP

(57) ABSTRACT

An optical unit having a shake correction function may include a movable body including an optical module; a fixed body that supports the movable body in a swingable manner; a swing drive mechanism that includes a magnet and a coil forming a magnet-coil pair, with a counterpart of the magnet-coil pair being fixed to the movable body and another counterpart to the fixed body, and swings the movable body relative to the fixed body; a magnetic detection sensor that detects a magnetic field of the magnet; and a magnetic member that returns the movable body to an original position by a magnetic attraction force with the magnet. The magnetic detection sensor overlaps the magnetic member as viewed in a direction orthogonal to a thickness direction of the magnetic member.

7 Claims, 8 Drawing Sheets

OPTICAL UNIT HAVING SHAKE CORRECTION FUNCTION

BACKGROUND

Cross Reference to Related Applications

The present application claims priority under 35 USC § 119 from Japanese Application No.: 2018-224949 filed on Nov. 30, 2018 and also from Japanese Application No. 2019-063495 filed on Mar. 28, 2019, both of which are incorporated herein by reference.

FIELD OF THE INVENTION

The present invention relates to an optical unit having a shake correction function installed on a mobile phone equipped with a camera.

DESCRIPTION OF THE RELATED DOCUMENTS

An example of such an optical unit is an optical unit having a shake correction function disclosed in Japanese Unexamined Patent Application Publication No. 2018-189816 (JP 2018-189816 A).

The optical unit having a shake correction function includes a movable body 3, a fixed body 5, magnets 26 fixed to the fixed body 5, and coils 62 and magnetic members 67 fixed to walls 56 of the movable body 3. JP 2018-189816 A discloses an attitude return mechanism 7 that returns the movable body 3 to the original position by the magnetic attraction force of the magnets 26 and the magnetic members 67, and a magnetic swing drive mechanism 6 that applies a driving force by the magnetic attraction force of the magnets 26 and the coils 62 as energized. Furthermore, JP 2018-189816 A discloses a configuration in which Hall elements 64 (hereinafter also referred to as "magnetic detection sensors") are disposed between the magnets 26 and the magnetic members 67.

The optical unit having a shake correction function of JP 2018-189816 A has a structure in which the Hall elements 64 are disposed between magnets 26 and magnetic members 67. As illustrated in FIG. 2 and FIG. 4 of JP 2018-189816 A, the Hall elements 64 are disposed closer to the magnets 26 than the magnetic members 67.

This arrangement impedes the downsizing of the optical unit having a shake correction function in the direction intersecting the optical axis direction of the optical unit.

An object of the present invention is to downsize the optical unit having a shake correction function in the direction intersecting the optical axis direction of the optical unit.

SUMMARY

An optical unit having a shake correction function that solves the issues described above may include a movable body including an optical module; a fixed body that supports the movable body in a swingable manner; a swing drive mechanism that includes a magnet and a coil forming a magnet-coil pair, with a counterpart of the magnet-coil pair being fixed to the movable body and another counterpart to the fixed body, and swings the movable body relative to the fixed body; a magnetic detection sensor that detects a magnetic field of the magnet; and a magnetic member that returns the movable body to an original position by a magnetic attraction force with the magnet, the magnetic detection sensor overlapping the magnetic member as viewed in a direction orthogonal to a thickness direction of the magnetic member.

According to at least an embodiment of the present invention, the magnetic detection sensor overlaps the magnetic member as viewed in a direction orthogonal to the thickness direction of the magnetic member. Thus, the optical unit having a shake correction function can be downsized in the direction (hereinafter also referred to as "radial direction") intersecting the optical axis direction of the optical unit.

In the optical unit having a shake correction function according to at least an embodiment of the present invention, it is preferable that the magnetic member include a first member and a second member disposed on both sides of the magnetic detection sensor.

According to at least an embodiment of the present invention, the magnetic member includes the first member and the second member disposed on both sides of the magnetic detection sensor. Thus, an overlapping arrangement can be readily achieved.

In the optical unit having a shake correction function according to at least an embodiment of the present invention, it is preferable that the magnetic member be formed in a square frame shape, with both ends of the first member and both ends of the second member being connected to each other through connecting portions.

According to at least an embodiment of the present invention, the magnetic member is formed in a square frame shape by connecting both ends of the first member and both ends of the second member to each other through the connecting portions. Thus, the assembling positions of the first member and the second member can be readily adjusted. The assembly is also easy.

In the optical unit having a shake correction function according to at least an embodiment of the present invention, it is preferable that the magnetic detection sensor be disposed at the center of the frame shape of the magnetic member.

According to at least an embodiment of the present invention, the magnetic detection sensor is disposed at the center of the frame shape of the magnetic member. Thus, the possibility of contact with the magnetic member and short-circuiting can be reduced.

In the optical unit having a shake correction function according to at least an embodiment of the present invention, it is preferable that, in the magnetic member, the width of the first member be larger than the width of the connecting portions, and the width of the second member be larger than the width of the connecting portions.

According to at least an embodiment of the present invention, in the magnetic member, the width of the first member is larger than the width of the connecting portions, and the width of the second member is larger than the width of the connecting portions. Thus, an arrangement space for the magnetic detection sensor can be readily provided in comparison with the case where the width of the connecting portions is the same as that of the first and second members. The large width of the first and second members increases the magnetic attraction force to return the movable body to the original position. Thus, the time required for returning to the original position can be reduced.

In the optical unit having a shake correction function according to at least an embodiment of the present invention, it is preferable that four corners of the frame shape of the magnetic member be cut into a tapered shape.

According to at least an embodiment of the present invention, the magnetic member has a frame shape with the four corners cut into a tapered shape. Thus, the return force for returning the movable body to the original position can be varied by the magnetic attraction force with the magnet. In this way, the return force can be combined with the magnetic torque to enhance the linearity of the operation sensitivity of the return force.

It is preferable that the optical unit having a shake correction function according to at least an embodiment of the present invention further include a wiring member connected with the coil, the wiring member including a mounting face to which the magnetic detection sensor, the magnetic member, and the coil are fixed, the magnetic detection sensor, the magnetic member, and the coil being fixed to the mounting face while the center of the magnetic detection sensor, the center of the magnetic member, and the center of the coil being aligned along an axis.

According to at least an embodiment of the present invention, the wiring member includes a mounting face to which the magnetic detection sensor, the magnetic member, and the coil are fixed; and the magnetic detection sensor, the magnetic member, and the coil are fixed to the mounting face while the center of the magnetic detection sensor, the center of the magnetic member, and the center of the coil are aligned along an axis. That is, the magnetic detection sensor, the magnetic member, and the coil fixed to the mounting face of the wiring member.

As a result, it is possible to fix the magnetic detection sensor, the magnetic member, and the coils to the wiring member before being assembled into a finished product. Thus, the functional centers of the components can be readily aligned before assembly.

The wiring member in which the magnetic detection sensor, the magnetic member, and the coil are aligned and fixed to the mounting face can be attached to the fixed body or the movable body, to achieve ready alignment with the magnet.

Thus, a decrease in the drive torque and a decrease in the position detection precision are suppressed in the optical unit having a shake correction function, and the shake correcting ability is stably shown.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 6:
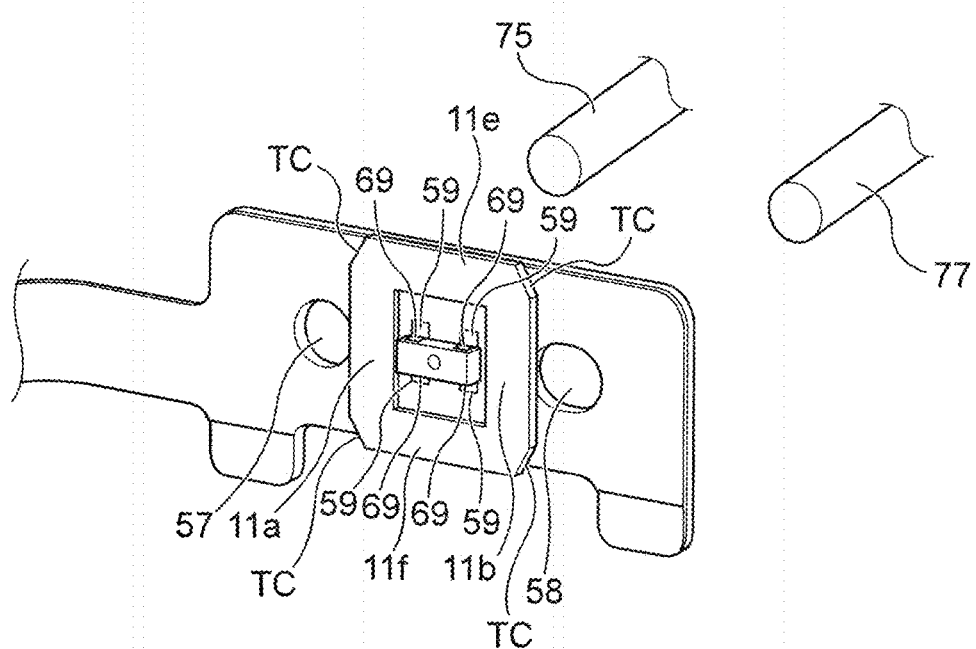
FIG. 6 is a perspective view of a state in which the coil is removed and corresponding to FIG. 4.
Figure 7:
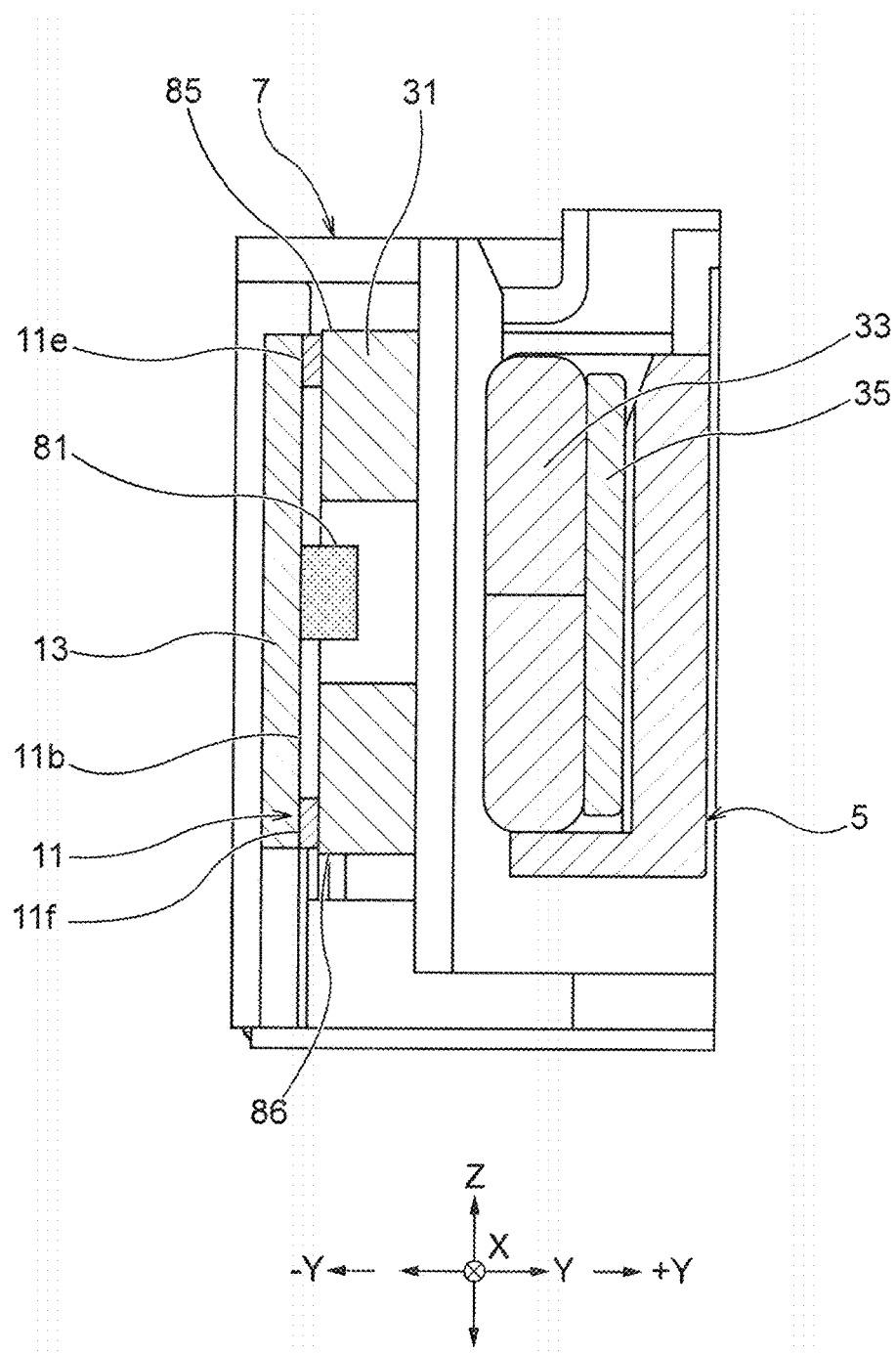
FIG. 7 is a longitudinal cross-sectional view taken along a line passing through the center of a magnetic detection sensor in FIG. 4.
Figure 8:
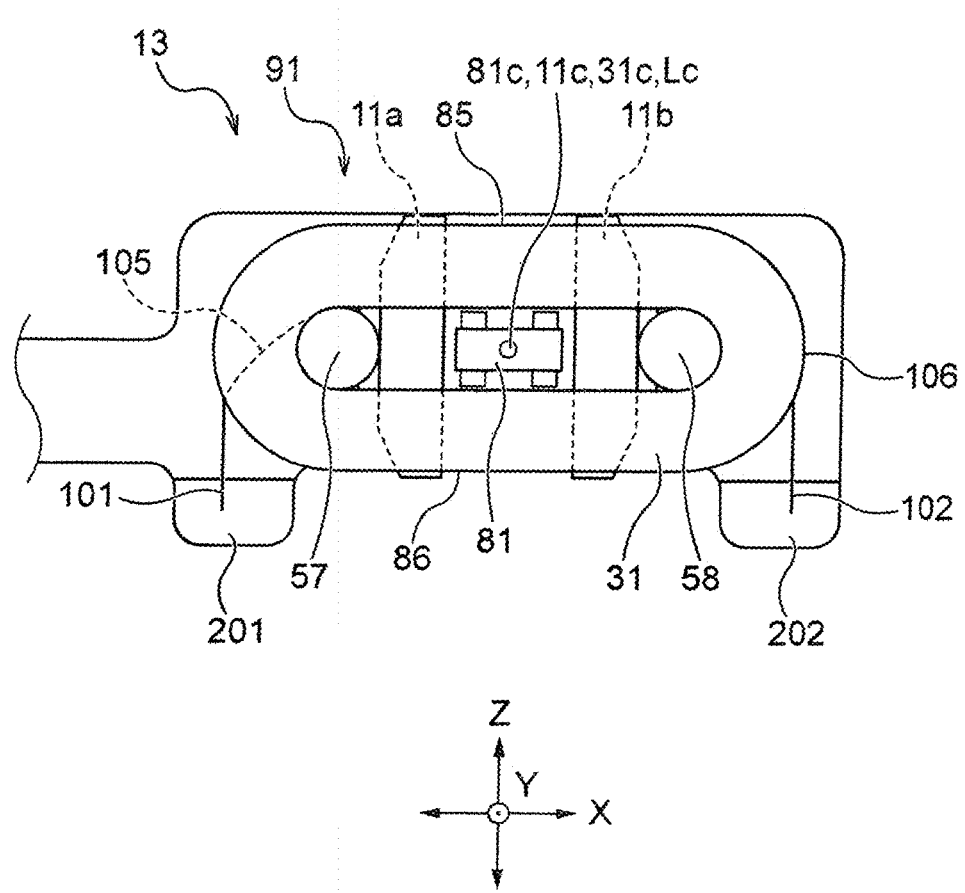
FIG. 8 is a front view corresponding to FIG. 5 and illustrating a second embodiment of the present invention.

An optical unit having a shake correction function according to at least an embodiment of the present invention will be described in detail with reference to FIG. 1 to FIG. 7 illustrating a first embodiment and FIG. 8 illustrating a second embodiment.

First Embodiment

An optical unit 1 having a shake correction function according to a first embodiment of the present invention is an optical unit having a function of correcting at least pitching (vertical shake) and yawing (lateral shake) of an optical module 3. The optical module 3 is used, for example, as a thin camera or the like mounted on a mobile phone equipped with a camera or a tablet personal computer (PC).

An actuator portion is a main component of the optical unit 1 having a shake correction function and holds the optical module 3 and corrects shake of the optical module 3 in the pitching direction Y and the yawing direction X.

The optical unit 1 having a shake correction function according to the first embodiment includes a movable body 5 including an optical module 3, a fixed body 7 that supports the movable body 5 in a swingable manner, a swing drive mechanism 23 that includes magnets 33 and 34 fixed to the movable body 5 and coils 31 and 32 fixed to the fixed body 7, and swings the movable body 5 relative to the fixed body 7, magnetic detection sensors 81 and 82 that detect the magnetic fields of the magnets 33 and 34, magnetic members 11 and 12 that return the movable body 5 to the original position by the magnetic attraction forces of the magnets 33 and 34, and a wiring member 13 connected with the coils 31 and 32.

The magnetic detection sensors 81 and 82 include Hall elements. The wiring member 13 includes a flexible wiring board.

Figure 2:
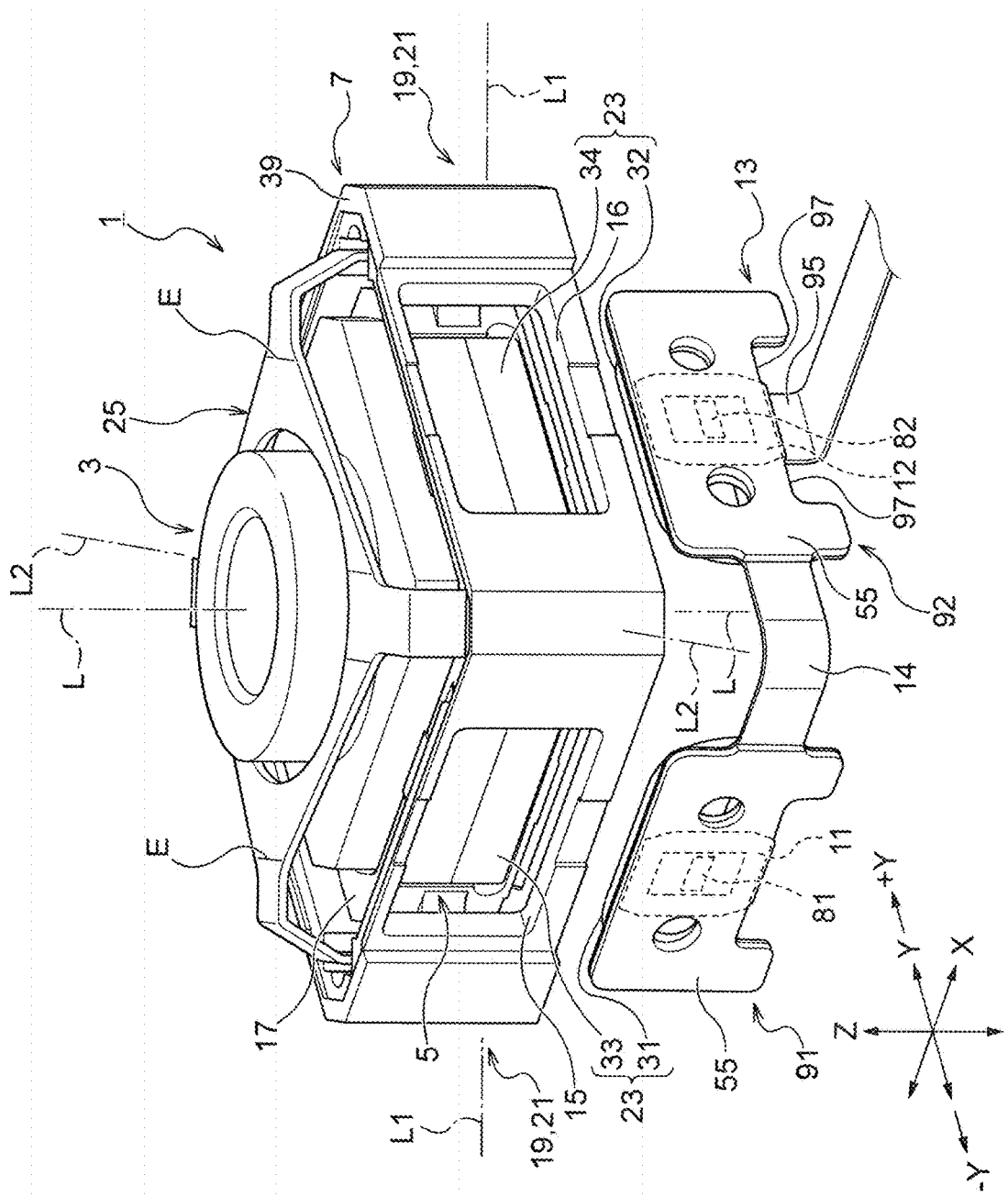
FIG. 2 is a perspective view of a state in which only a wiring member is separated from the optical unit illustrated in FIG. 1.

As illustrated in FIG. 2, the wiring member 13 has two mounting faces 91 and 92. The magnetic detection sensor 81, the magnetic member 11, and the coil 31 are fixed to the mounting face 91. The magnetic detection sensor 82, the magnetic member 12, and the coil 32 are fixed to the mounting face 92. The mounting faces 91 and 92 are reinforced with reinforcing plates 55. The wiring member 13 has a connecting portion 14 connecting the mounting faces 91 and 92. The line width of the connecting portion 14 is smaller than the width of the mounting faces 91 and 92 in the same direction as the line width. The mounting faces 91 and 92 in this description may not be a strictly flat face so long as the magnetic detection sensors 81 and 82, the magnetic members 11 and 12, and the coils 31 and 32 can be fixed thereto.

The mounting face 91 on which the magnetic detection sensor 81, the magnetic member 11, and the coil 31 are fixed is attached to an attachment site 15 of the fixed body 7. The mounting face 92 on which the magnetic detection sensor 82, the magnetic member 12, and the coil 32 are fixed is attached to an attachment site 16 of the fixed body 7. In this way, the relative positions of the components and the magnets 33 and 34 are determined.

As illustrated in FIG. 7, the magnetic detection sensor 81 overlaps the magnetic member 11 in a direction orthogonal to the thickness direction or Y direction of the magnetic member 11.

Although not illustrated, the magnetic detection sensor 82 overlaps the magnetic member 12 in a direction orthogonal to the thickness direction or Y direction of the magnetic member 12.

Figure 4:
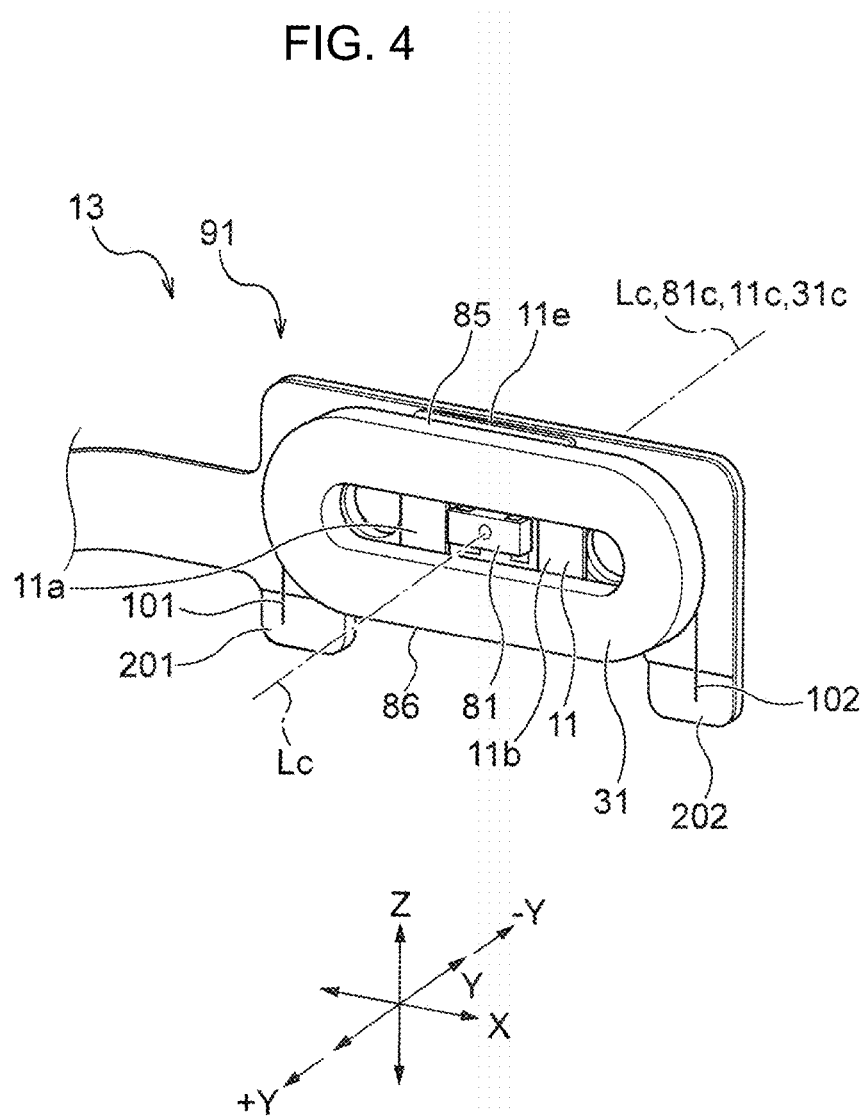
FIG. 4 is a perspective view of the main portion of the wiring member according to the first embodiment viewed from the coil side.
Figure 5:
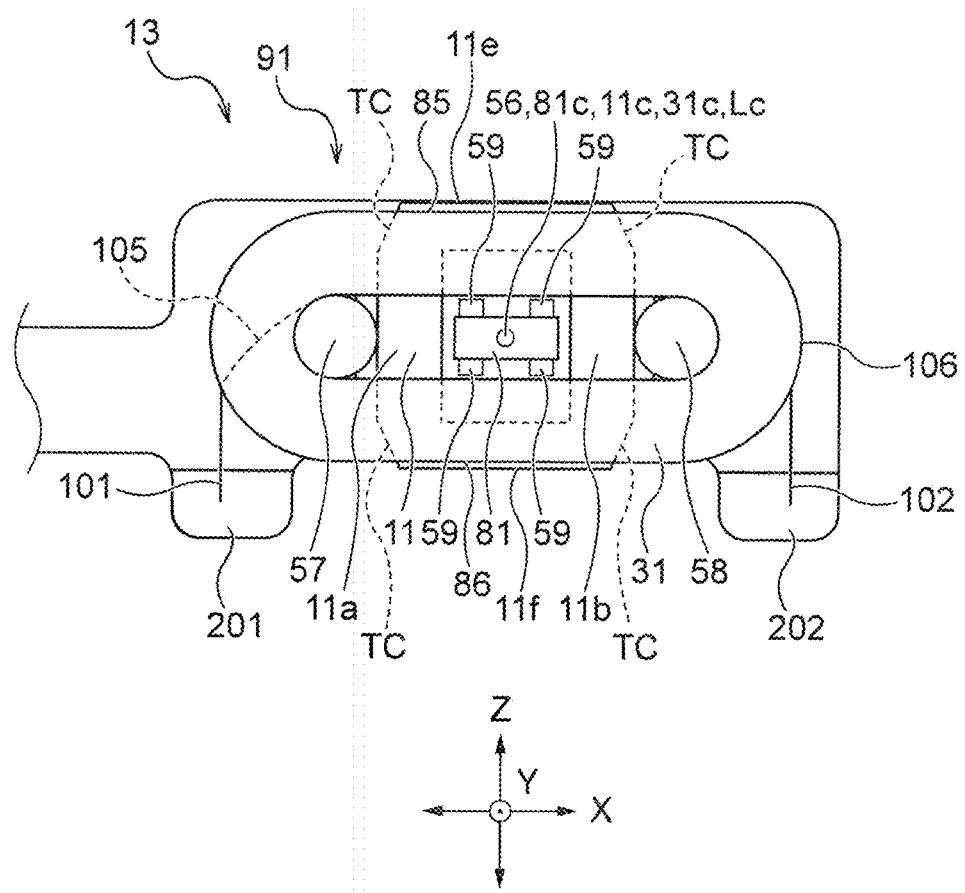
FIG. 5 is a front view of the main portion of the wiring member as viewed from the coil side and corresponding to FIG. 4.

In specific, as shown in FIG. 4 to FIG. 6, the magnetic member 11 according to the first embodiment includes a pair of members, a first member 11a and a second member 11b, disposed on both sides of the magnetic detection sensor 81 in the X direction. The first member 11a and the second member 11b provide the function of returning the movable body 5 to the original position. The first member 11a and the second member 11b are connected at the two ends by connecting portions 11e and 11f so as to define the rectangular frame shape of the magnetic member 11.

As illustrated in FIG. 4 and FIG. 5, in the first embodiment, the magnetic detection sensor 81, the magnetic member 11, and the coil 31 are fixed to the mounting face 91 such that the center 81c of the magnetic detection sensor 81, the center 11c of the magnetic member 11, and the center 31c of the coil 31 are aligned along an axis Lc. That is, the magnetic detection sensor 81 is disposed at the center of the frame-shaped magnetic member 11. Although not illustrated, similarly, the magnetic detection sensor 82, the magnetic member 12, and the coil 32 are fixed to the mounting face 92 such that the center 82c of the magnetic detection sensor 82, the center 12c of the magnetic member 12, and the center 32c of the coil 32 are aligned along the axis Lc. That is, the magnetic detection sensor 82 is disposed at the center of the frame-shaped magnetic member 12.

Here, the center 81c of the magnetic detection sensor 81 refers not to the center of the external shape of the sensor body but to the functional center of the magnetic detection sensor 81.

The center 11c of the magnetic member 11 refers to a functional center of a magnetic member that uses a magnetic attraction force with the magnet 33 to return the movable body to the original position. For example, in the case where the magnetic member is composed of two separate components, the center 11c of the magnetic member 11 refers to the functional center of the two components of the magnetic member.

The term "center of a coil" refers to the functional center of a coil in the swing drive mechanism that swings the movable body.

As illustrated in FIG. 5 and FIG. 6, in the magnetic member 11 according to the first embodiment, the width of the first member 11a is larger than that of the connecting portion 11e and the connecting portion 11f, and the width of the second member 11b is larger than that of the connecting portion 11e and the connecting portion 11f.

As a result, the magnetic member 11 can readily provide an arrangement space in a state where the magnetic member 11 overlaps the magnetic detection sensor 81.

As illustrated in FIG. 5 and FIG. 6, the magnetic member 11 according to the first embodiment has a frame shape in which the four corners have tapered sections TC.

The magnetic member 11 has a frame shape with the four corners cut into a tapered shape. Thus, the return force for returning the movable body 5 to the original position can be varied by the magnetic attraction force with the magnet 33. In this way, the return force can be combined with the magnetic torque to enhance the linearity of the operation sensitivity of the return force.

The specific configuration of the entire optical unit 1 having a shake correction function will now be described in detail.

The optical unit 1 having a shake correction function according to the first embodiment includes a fixed body 7 that surrounds and supports a movable body 5 so as to be shiftable in the pitching (vertical shake) direction Y and the yawing (lateral shake) direction X, and a support mechanism 21 that includes a gimbal frame 25 supporting the movable body 5 so as to be rotatable relative to the fixed body 7 around a first axis L1 intersecting the optical axis direction L of an optical module 3. The support mechanism 21 supports the movable body 5 via a first support 19 such that the movable body 5 is rotatable around the first axis L1 relative to the fixed body 7.

In the first embodiment, the support mechanism 21 also supports the movable body 5 on the gimbal frame 25 via a second support 20 such that movable body 5 is rotatable around a second axis L2 intersecting the optical axis L and the first axis L1.

Figure 1:
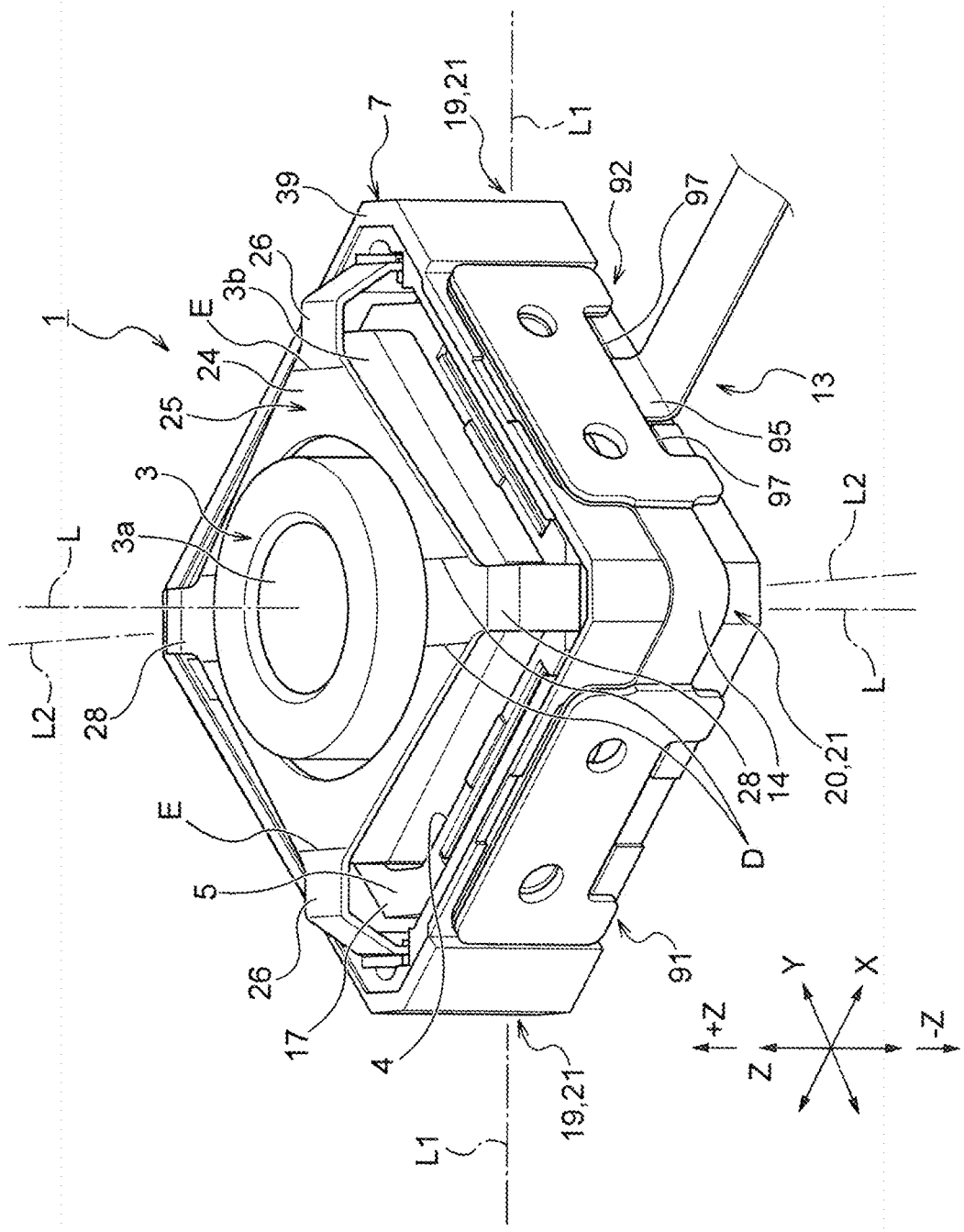
FIG. 1 is a perspective view of an optical unit having a shake correction function according to a first embodiment of the present invention.
Figure 3:
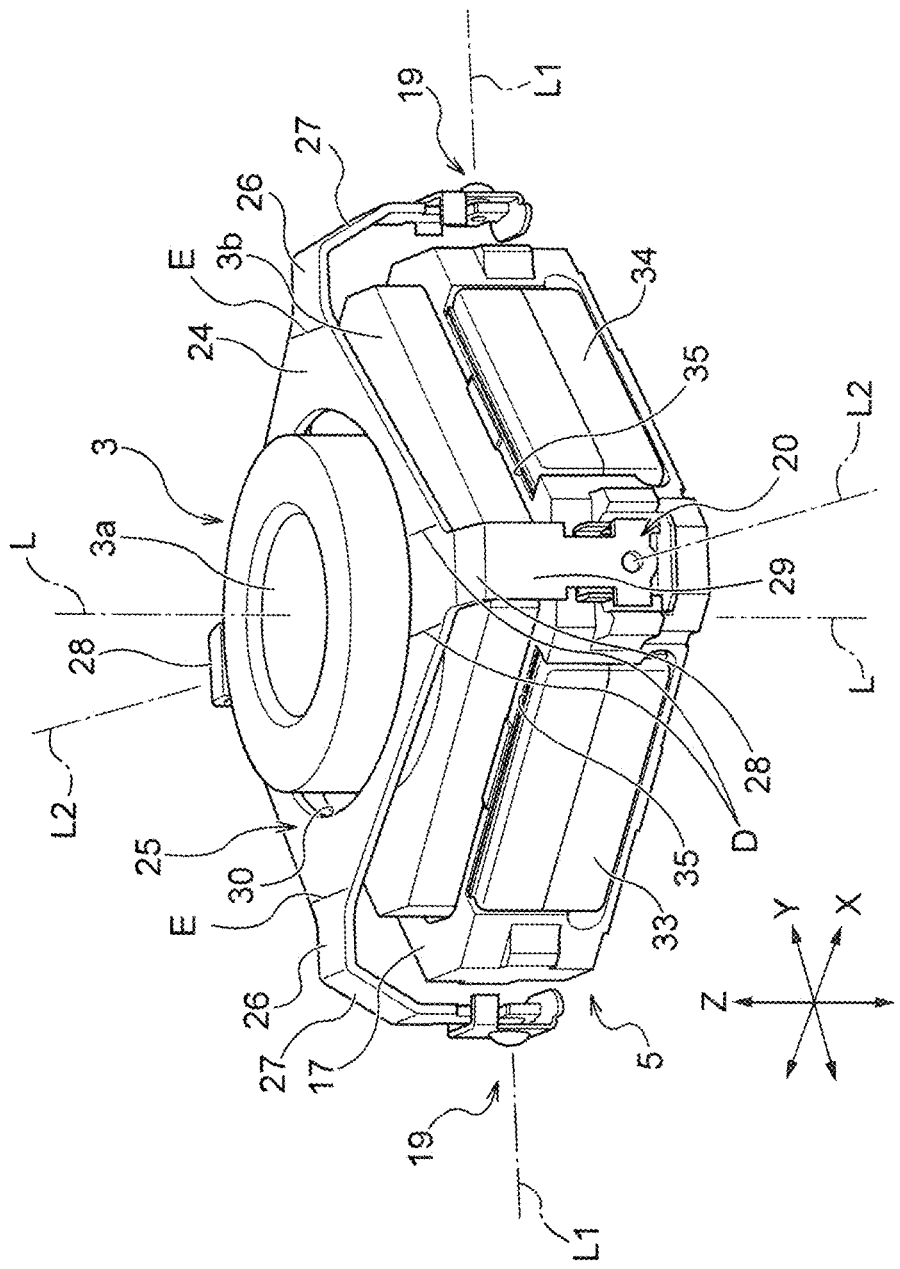
FIG. 3 is a perspective view of a movable body part from which the wiring members and a fixed body are removed from the optical unit illustrated in FIG. 2.

The first embodiment includes a swing drive mechanism 23 that drives the movable body 5 around the first axis L1 and the second axis L2. The swing drive mechanism 23 corrects the attitude of the movable body 5 and includes correction coils 31 and 32 and magnets 33 and 34. The correction coils 31 and 32 are disposed on the fixed body 7, as illustrated in FIG. 1 and FIG. 2, and the magnets 33 and 34 are disposed on the movable body 5, as illustrated in FIG. 2 and FIG. 3. In FIG. 3, the reference numeral 35 denotes a yoke.

The correction coils 31 and 32 and the magnets 33 and 34 perform pitching and yawing correction of the movable body 5.

Movable Body

As illustrated in FIG. 3, the movable body 5 includes an optical module 3 and a frame 17 holding the optical module 3, with the magnets 33 and 34 for detecting and correcting pitching and yawing being attached to the frame 17.

The optical module 3 includes a lens 3a on the object side +Z. A rectangular housing 3b of the optical module 3 accommodates optical equipment for image capturing. The frame 17 is a rectangular frame-shaped member that surrounds the four faces of the optical module 3 other than the front face on which the lens 3a of the optical module 3 is disposed and the rear face opposite to the front face. The magnets 33 and 34 for detecting pinching and yawing are fixed to two outer faces of the frame 17.

Fixed Body

As illustrated in FIG. 1 and FIG. 2, the fixed body 7 includes an outer casing 39. The coils 31 and 32 for correcting the pitching and yawing and the wiring member 13 are disposed inside the outer casing 39. In the first embodiment, as illustrated in FIG. 2, the correction coils 31 and 32 are disposed on the back side of the wiring member 13 at positions corresponding to the magnets 33 and 34.

The outer casing 39 has a window 4 on the front face on the object side +Z and an opening on the rear face on the opposite side −Z. The outer casing 39 is a rectangular container slightly larger than the optical module 3.

Supporting Mechanism Including Gimbal Frame

As illustrated in FIG. 1 and FIG. 3, the support mechanism 21 includes a gimbal frame 25 having resilience generated by bending a flat metal plate. In the first embodiment, the gimbal frame 25 is disposed on the object side +Z of the optical module 3. A circular opening 30 is formed in the central region of a base frame 24 on the light incident side of the optical module 3. The gimbal frame 25, which has an overall X-shape, includes a rectangular base frame 24 having an opening 30 in the center, first extensions 26 that extend along the first axis L1 about the optical axis L, and second extensions 28 that extend from the corners of the base frame 24 along the second axis L2, the first extensions 26 and the second extensions 28 extending about the optical axis L from the four corners of the base frame 24.

In the first embodiment, the gimbal frame 25 includes first support extensions 27 and second support extensions 29 that are disposed in an X shape and elongated in the extension directions. The distal portions of the first extensions 26 and the second extensions 28 are bent along the optical axis direction L to respectively form the first support extensions 27 and the second support extensions 29. The first supports 19 are disposed on the first support extensions 27, and the second supports 20 are disposed on the second support extensions 29.

As illustrated in FIG. 1 to FIG. 3, in the gimbal frame 25, the gaps in the optical axis direction L between the first extensions 26 and the movable body 5 are larger than the gaps in the optical axis direction L between the second extensions 28 and the movable body 5. In other words, the gimbal frame 25 is bent along the bending lines D and E so that the height of the distal ends of the first extensions 26 in the optical axis direction +Z is higher than the height of the distal ends of the second extensions 28 in the optical axis direction +Z or higher relative to the movable body 5.

All of the first support extensions 27 and the second support extensions 29 may not have plate shapes. Alternatively, some of the first support extensions 27 and the second support extensions 29 may have plate shapes to generate resilience. One of the first support extensions 27 and the second support extensions 29 may be any shape besides a plate shape (for example, a rod shape).

As illustrated in FIG. 5, in the first embodiment, the mounting face 91 of the wiring member 13 further includes a sensor fixing region 56 to which the magnetic detection sensor 81 is fixed, and positioning holes 57 and 58 for aligning the center 81c of the magnetic detection sensor 81, the center 11c of the magnetic member 11, and the center 31c of the coil 31 on the axis Lc.

A method of fixing the magnetic detection sensor 81, the magnetic member 11, and the coil 31 to the mounting face 91 will now be described.

(1) The magnetic detection sensor 81 is aligned with the sensor fixing region 56 of the wiring member 13 and fixed using a positioning jig, or the like, to position the center 81c of the magnetic detection sensor 81. In FIG. 5, reference numerals 59 are lands for electrical connection disposed on the wiring member 13. The lands 59 are disposed at provided at four positions.

As illustrated in FIG. 6, four terminals 69 of the magnetic detection sensor 81 are aligned and soldered with the lands 59, to position and fix the magnetic detection sensor 81 on the mounting face 91.

The mounting face 92 is also provided with a sensor fixing region and positioning holes that have the same structures as those of the mounting face 91. Thus, descriptions thereof are omitted.

(2) The magnetic member 11 is positioned and fixed using positioning jigs, or the like, with reference to the center 81c of the magnetic detection sensor 81, to position and fix the magnetic member 11 to the mounting face 91. The magnetic member 11 is fixed to the mounting face 91 using plating and soldering. Alternatively, the magnetic member 11 may be fixed using an adhesive agent.

(3) Positioning jigs or positioning pins 75 and 77 are respectively inserted into the positioning holes 57 and 58 in the mounting face 91 in the state illustrated in FIG. 6. Here, the positioning hole 57 is a reference hole having a shape matching the positioning pin 75. The positioning hole 58 is a long hole extended in the X direction. By making one of the holes long, the two positioning pins can be readily inserted into the two positioning holes.

Subsequently, the coil 31 is fit over the positioning pins 75 and 77 while the positioning pins 75 and 77 are passed through the positioning holes 57 and 58. This results in the state illustrated in FIG. 5. The positioning holes 57 and 58 are provided for alignment of the center 81c of the magnetic detection sensor 81, the center 11c of the magnetic member 11, and the center 31c of the coil 31 with the axis Lc. In this way, the coil 31 is also positioned and fixed. The coil 31 is fixed to the mounting face 91 of the magnetic member 11 using an adhesive agent.

As illustrated in FIG. 4 and FIG. 5, in the first embodiment, the two end portions of the magnetic member 11 in the Z direction are fixed to the effective sides 85 and 86 of the coil 31 corresponding to the magnet 33. Here, the term "effective side" refers to the side necessary for generating an electromagnetic force by the action between the magnet 33 and the coil 31.

As a result, when the coil 31 is not energized, the magnetic member 11 generates a magnetic force between the magnetic member 11 and the magnet 33. When the coil 31 is energized, the magnetic member 11 serves as a back yoke that intensifies the magnetic force between the magnet 33 and the coil 31.

As illustrated in FIG. 1 and FIG. 2, in the first embodiment, the wiring member 13 has an extending portion 95 that extends from the mounting face 91 in the direction along the surface, and a recess 97 formed in the area where the mounting face 91 is connected with the extending portion 95.

As a result, the recess 97 can reduce the stress generated on the mounting face 91 when the extending portion 95 is bent and routed.

As illustrated in FIG. 4 and FIG. 5, in the first embodiment, the wiring member 13 includes lands 201 and 202 that are electrically connected with a first end 101 and a second end 102, respectively, of the coil 31. The winding start position 105 and the winding end position 106 of the coil 31 are disposed at positions corresponding to the lands 201 and 202, respectively.

Here, for the positions 105 and 106 of the coil 31 to be disposed at positions corresponding to the lands 201 and 202, respectively, the positions 105 and 106 of the coil 31 do not have to be in exact alignment with the lands 201 and 202, respectively, in the Z direction. For the positions 105 and 106 of the coil 31 to correspond to the lands 201 and 202, respectively, the positions 105 and 106 of the coil 31 should be disposed in a relative arrangement in which the positions 105 and 106 are disposed close to the lands 201 and 202, respectively. In other words, the positions 105 and 106 of the coil 31 and the regions in which the lands 201 and 202 reside in the X direction should be disposed in a relative overlapping arrangement. In the relative overlapping arrangement, the positions 105 and 106 and the lands 201 and 202 do not have to exactly align and may be slightly displaced. For example, the winding start position 105 of the coil 31 may be set such that the first end 101 extends from an inner circumferential position (in contact with the positioning hole 57) of the coil 31 to the region in which the land 201 resides by the shortest distance, besides routing the coil 31 so as to extend the first end 101 to the substantial center of the land 201 in the width direction, as illustrated in FIG. 5.

In this way, the first end 101 of the lead of the coil 31 in the winding start position 105 and the second end 102 of the lead of the coil 31 in the winding end position 106 can be directly connected with the lands 201 and 202, respectively, and readily connected by soldering, or the like.

Advantageous Effects of First Embodiment

The magnetic detection sensors 81 and 82 overlap the magnetic members 11 and 12, respectively, as viewed in a direction orthogonal to the thickness direction of the magnetic members 11 and 12. Thus, the optical unit 1 having a shake correction function can be downsized in the direction (hereinafter, also referred to as "radial direction") intersecting the optical axis direction of the optical unit.

In the first embodiment, the magnetic members 11 and 12 include the first members 11*a* and the second members 11*b* disposed on both sides of the magnetic detection sensors 81 and 82, respectively. Thus, an overlapping arrangement can be readily achieved.

In the first embodiment, the magnetic members 11 and 12 each include the first member 11*a* and the second member 11*b* connected by the connecting portions 11*e* and 11*f* at the four corners. Thus, the assembling positions of the first member 11*a* and the second member 11*b* can be readily adjusted. The assembly is also easy.

In the first embodiment, the magnetic detection sensors 81 and 82 are disposed at the centers of the frame shapes of the magnetic members 11 and 12. Thus, the possibility of contact with the magnetic members 11 and 12 and short-circuiting can be reduced.

The wiring member 13 includes the magnetic detection sensors 81 and 82, the magnetic members 11 and 12, and the mounting faces 91 and 92 on which the coils 31 and 32 are fixed. The magnetic detection sensors 81 and 82, the magnetic members 11 and 12, and the coils 31 and 32 are fixed to the mounting faces 91 and 92 such that the centers 81*c* and 82*c*, the centers 11*c* and 12*c*, and the centers 31*c* and 32*c* are aligned along the axis Lc. That is, the magnetic detection sensors 81 and 82, the magnetic members 11 and 12, and the coils 31 and 32 are fixed to the mounting faces 91 and 92 of the wiring member 13.

As a result, it is possible to fix the magnetic detection sensors 81 and 82, the magnetic members 11 and 12, and the coils 31 and 32 to the wiring member 13 before being assembled into the finished product. Thus, the functional centers of the components can be more readily aligned before assembly in comparison with that of a conventional structure.

The wiring member 13 in which the magnetic detection sensors 81 and 82, the magnetic members 11 and 12, and the coils 31 and 32 are aligned and fixed to the mounting faces 91 and 92 can be attached to the fixed body 7 or the movable body 5, to achieve ready alignment with the magnets 33 and 34.

Thus, a decrease in the drive torque and a decrease in the position detection precision can be suppressed in the optical unit 1 having a shake correction function, and the shake correcting ability can stably be shown.

In the first embodiment, the wiring member 13 in which the magnetic detection sensors 81 and 82, the magnetic members 11 and 12, and the coils 31 and 32 are aligned and fixed to the mounting faces 91 and 92 can be attached to the attachment sites 15 and 16 of the fixed body 7, to complete the assembly. Thus, assembly is easy. The wiring member 13 can also be readily aligned with the magnets 33 and 34 on the movable body 5.

In the first embodiment, the wiring member 13 includes multiple mounting faces 91 and 92. Thus, it supports a shake correction structure for correcting shake around two or more axes.

The connecting portion 14 that connects the mounting faces 91 and 92 has a width smaller than that of the mounting faces 91 and 92 in the same direction. Thus, the wiring member 13 can be readily routed by bending, and the relative positions of adjacent mounting faces 91 and 92 can be finely and readily adjusted. The stress generated in the wiring member 13 when bent can be reduced.

Second Embodiment

An optical unit 1 having a shake correction function according to a second embodiment will now be described with reference to FIG. 8. FIG. 8 is a diagram corresponding to FIG. 5 of the first embodiment. Configurations that differ from those of the first embodiment will be described. Common elements will be denoted by the same reference numerals, and descriptions thereof will be omitted.

The second embodiment includes paired magnetic members 11*a* and 11*b*, as illustrated in FIG. 8. In other words, two magnetic members are provided, unlike the single magnetic member having a square frame shape according to the first embodiment. The magnetic members 11*a* and 11*b* have the same magnetic characteristics.

The second embodiment achieves the same advantageous effects as those of the first embodiment.

Other Embodiments

The optical unit 1 having a shake correction function according to at least an embodiment of the present invention basically has the above-described configuration. However, it is also possible to make changes and omissions in parts of the configuration without departing from the scope of the invention.

In the first and second embodiments, the magnetic detection sensors 81 and 82, the magnetic members 11 and 12, and the coils 31 and 32 are all fixed to the mounting faces 91 and 92 of the wiring member 13. Alternatively, the components may be fixed to a holder other than the wiring member 13 so long as the magnetic detection sensors 81 and 82 overlap the magnetic members 11 and 12, respectively, as viewed in a direction orthogonal to the thickness direction of the magnetic members 11 and 12.

Similarly, the positioning holes 57 and 58 in the wiring member 13 may be replaced by positioning jigs.

In the first and second embodiments, the magnets 33 and 34 of the swing drive mechanism 23 are fixed to the movable body 5, and the coils 31 and 32 are fixed to the fixed body 7. Alternatively, the magnets 33 and 34 of the swing drive mechanism 23 may be fixed to the fixed body 7, and the coils 31 and 32 may be fixed to the movable body 5.

The wiring member 13 is not limited to a flexible wiring board and may be any other type of wiring member. However, it is desirable that the wiring member has the same characteristics as a flexible wiring board.

The optical module 3 is not limited to the camera module described in the embodiments, and alternatively may be any other module, such as a laser irradiation module or an optical sensor module. In the case where the optical module 3 has any other shape, such as a cylindrical shape, the shapes of the holder frame 17 and the outer casing 39 can match the shape of the optical module 3.

What is claimed is:

1. An optical unit having a shake correction function, comprising:
a movable body including an optical module;
a fixed body that supports the movable body in a swingable manner;
a swing drive mechanism that includes a magnet and a coil forming a magnet-coil pair, with a counterpart of the magnet-coil pair being fixed to the movable body and another counterpart to the fixed body, and swings the movable body relative to the fixed body;
a magnetic detection sensor that detects a magnetic field of the magnet; and
a magnetic member that returns the movable body to an original position by a magnetic attraction force with the magnet,
the magnetic detection sensor overlapping the magnetic member as viewed in a direction orthogonal to a thickness direction of the magnetic member.

2. The optical unit having a shake correction function according to claim 1, wherein the magnetic member includes a first member and a second member disposed on both sides of the magnetic detection sensor.

3. The optical unit having a shake correction function according to claim 2, wherein the magnetic member is formed in a square frame shape, with both ends of the first member and both ends of the second member being connected to each other through connecting portions.

4. The optical unit having a shake correction function according to claim 3, wherein the magnetic detection sensor is disposed at a center of the frame shape of the magnetic member.

5. The optical unit having a shake correction function according to claim 3, wherein, in the magnetic member, the first member is larger in width than the connecting portions, and the second member is larger in width than the connecting portions.

6. The optical unit having a shake correction function according to claim 3, wherein four corners of the frame shape of the magnetic member are cut into a tapered shape.

7. The optical unit having a shake correction function according to claim 1, further comprising:
a wiring member connected with the coil,
the wiring member including:
a mounting face to which the magnetic detection sensor, the magnetic member, and the coil are fixed,
wherein a center of the magnetic detection sensor, a center of the magnetic member, and a center of the coil are aligned along an axis.

* * * * *